US012668212B1

(12) United States Patent　　(10) Patent No.: US 12,668,212 B1

Stone　　(45) Date of Patent: Jun. 30, 2026

(54) DEVICE FOR MANUALLY MOVING A TRAILER

(71) Applicant: Joshua Stone, Murrells Inlet, SC (US)

(72) Inventor: Joshua Stone, Murrells Inlet, SC (US)

( * ) Notice: Subject to any disclaimer, the term of this patent is extended or adjusted under 35 U.S.C. 154(b) by 378 days.

(21) Appl. No.: 18/483,664

(22) Filed: Oct. 10, 2023

(51) Int. Cl.
　　　*B60S 13/00*　　　(2006.01)
　　　*B66F 7/26*　　　(2006.01)

(52) U.S. Cl.
　　　CPC ................ *B60S 13/00* (2013.01); *B66F 7/26* (2013.01)

(58) Field of Classification Search
　　　CPC .............. B66F 7/26; B60S 13/00; B60D 1/66
　　　See application file for complete search history.

(56) References Cited

U.S. PATENT DOCUMENTS

| | | | | |
|---|---|---|---|---|
| 3,189,365 | A | * | 6/1965 | Blacher .............. B62D 53/0864 |
| | | | | 280/47.24 |
| 3,847,407 | A | * | 11/1974 | Balletto .................... B62B 1/08 |
| | | | | 280/46 |
| 4,645,224 | A | | 2/1987 | Poganski |
| 6,024,374 | A | | 2/2000 | Friesen |

| | | | | |
|---|---|---|---|---|
| D439,208 | S | | 3/2001 | Salwasser |
| 6,663,136 | B2 | | 12/2003 | Stevens |
| 7,845,670 | B2 | | 12/2010 | Oberg |
| 9,764,610 | B2 | | 9/2017 | McCall |
| 2002/0093173 | A1 | * | 7/2002 | Stevens ..................... B60D 1/66 |
| | | | | 280/504 |
| 2010/0117331 | A1 | * | 5/2010 | Oberg ...................... B60D 1/66 |
| | | | | 280/476.1 |
| 2015/0266406 | A1 | | 9/2015 | Stombaugh |
| 2016/0375942 | A1 | * | 12/2016 | Chen ........................ B60S 13/00 |
| | | | | 180/11 |
| 2017/0246925 | A1 | | 8/2017 | Coetsee |
| 2019/0168555 | A1 | * | 6/2019 | Axelson, Jr. .......... B60D 1/665 |
| 2020/0094863 | A1 | * | 3/2020 | Parrish ..................... B60D 1/52 |

FOREIGN PATENT DOCUMENTS

WO　　　2015130839　　　9/2015

* cited by examiner

*Primary Examiner* — Valentin Neacsu
*Assistant Examiner* — Hosam Shabara
(74) *Attorney, Agent, or Firm* — Kyle A. Fletcher, Esq.

(57)　　　　ABSTRACT

The device for manually moving a trailer is a mechanical device that removably attaches to a trailer. The device for manually moving a trailer forms a grip that allows the trailer to be manually moved. The device for manually moving a trailer incorporates a hitch beam structure, an elevating stanchion structure, and a handle structure. The hitch beam structure attaches to the elevating stanchion structure. The handle structure attaches to the elevating stanchion structure. The hitch beam structure forms the removable attachment with the trailer.

9 Claims, 5 Drawing Sheets

100

121

102

111

131
103
132

101

102

103

DEVICE FOR MANUALLY MOVING A TRAILER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle-maneuvering devices separate from the vehicle. (B60S13/00)

SUMMARY OF INVENTION

The device for manually moving a trailer is a mechanical device. The device for manually moving a trailer removably attaches to a trailer. The device for manually moving a trailer forms a grip that allows the trailer to be manually moved. The device for manually moving a trailer comprises a hitch beam structure, an elevating stanchion structure, and a handle structure. The hitch beam structure attaches to the elevating stanchion structure. The handle structure attaches to the elevating stanchion structure. The hitch beam structure forms the removable attachment with the trailer.

These together with additional objects, features and advantages of the device for manually moving a trailer will be readily apparent to those of ordinary skill in the art upon reading the following detailed description of the presently preferred, but nonetheless illustrative, embodiments when taken in conjunction with the accompanying drawings.

In this respect, before explaining the current embodiments of the device for manually moving a trailer in detail, it is to be understood that the device for manually moving a trailer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the device for manually moving a trailer.

It is therefore important that the claims be regarded as including such equivalent construction insofar as they do not depart from the spirit and scope of the device for manually moving a trailer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention.

They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
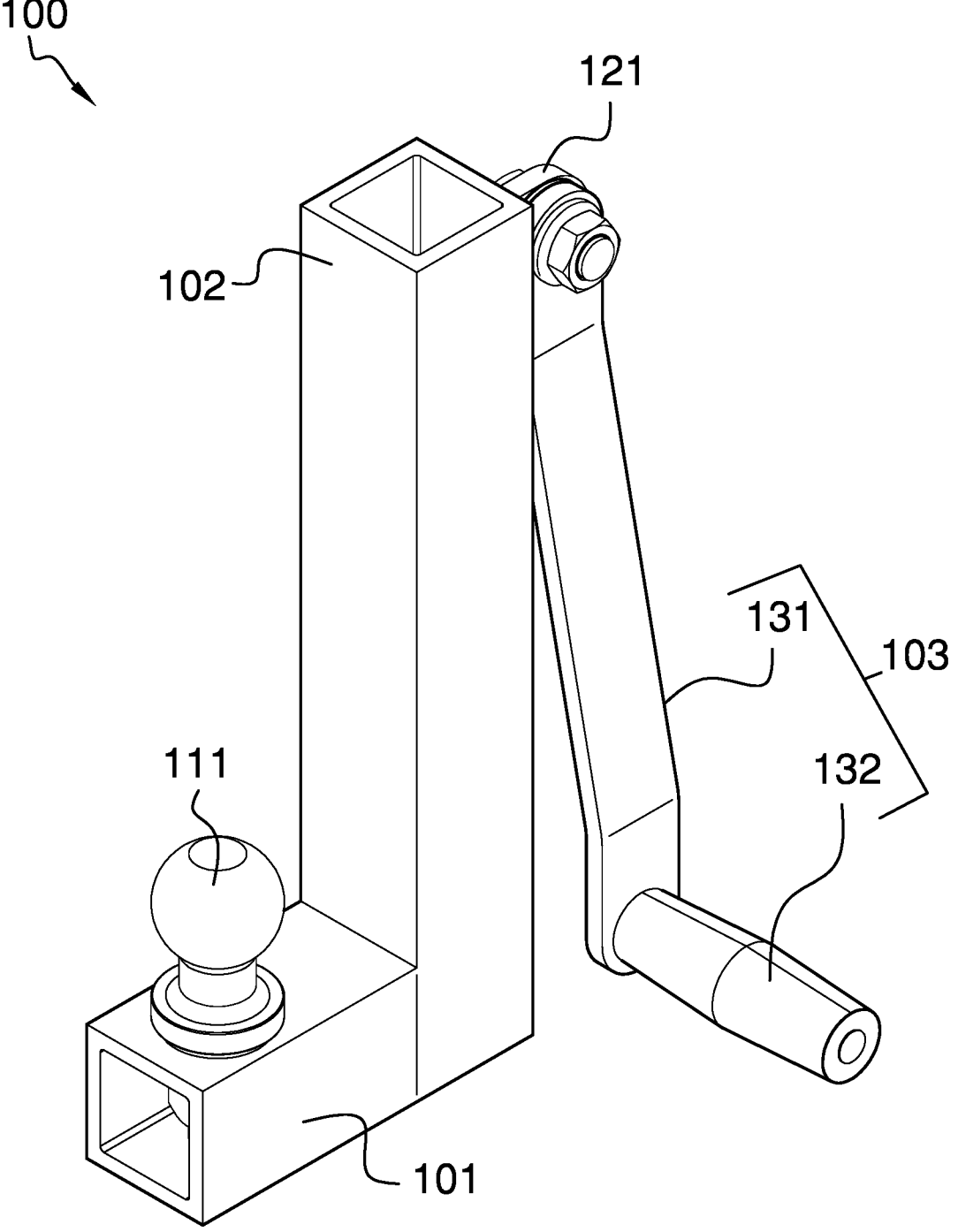
FIG. 1 is a perspective view of an embodiment of the disclosure.
Figure 2:
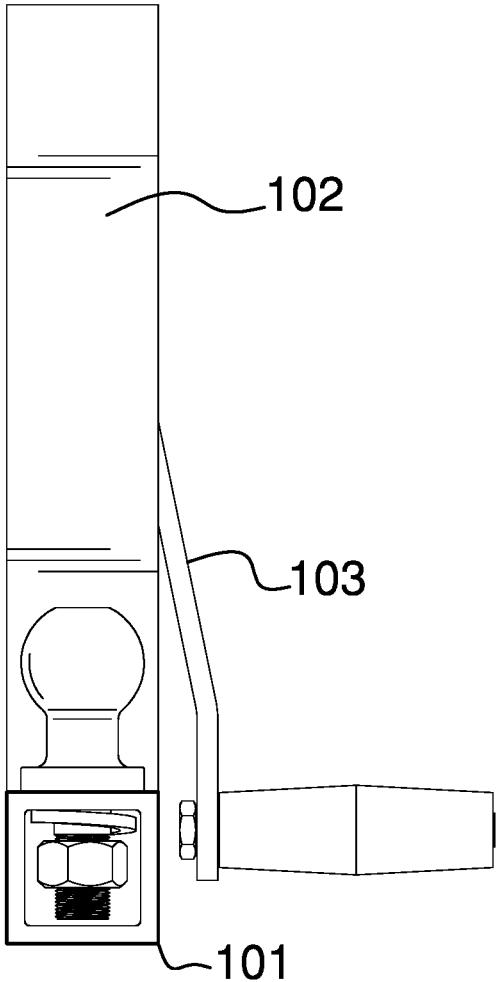
FIG. 2 is an anterior view of an embodiment of the disclosure.
Figure 3:
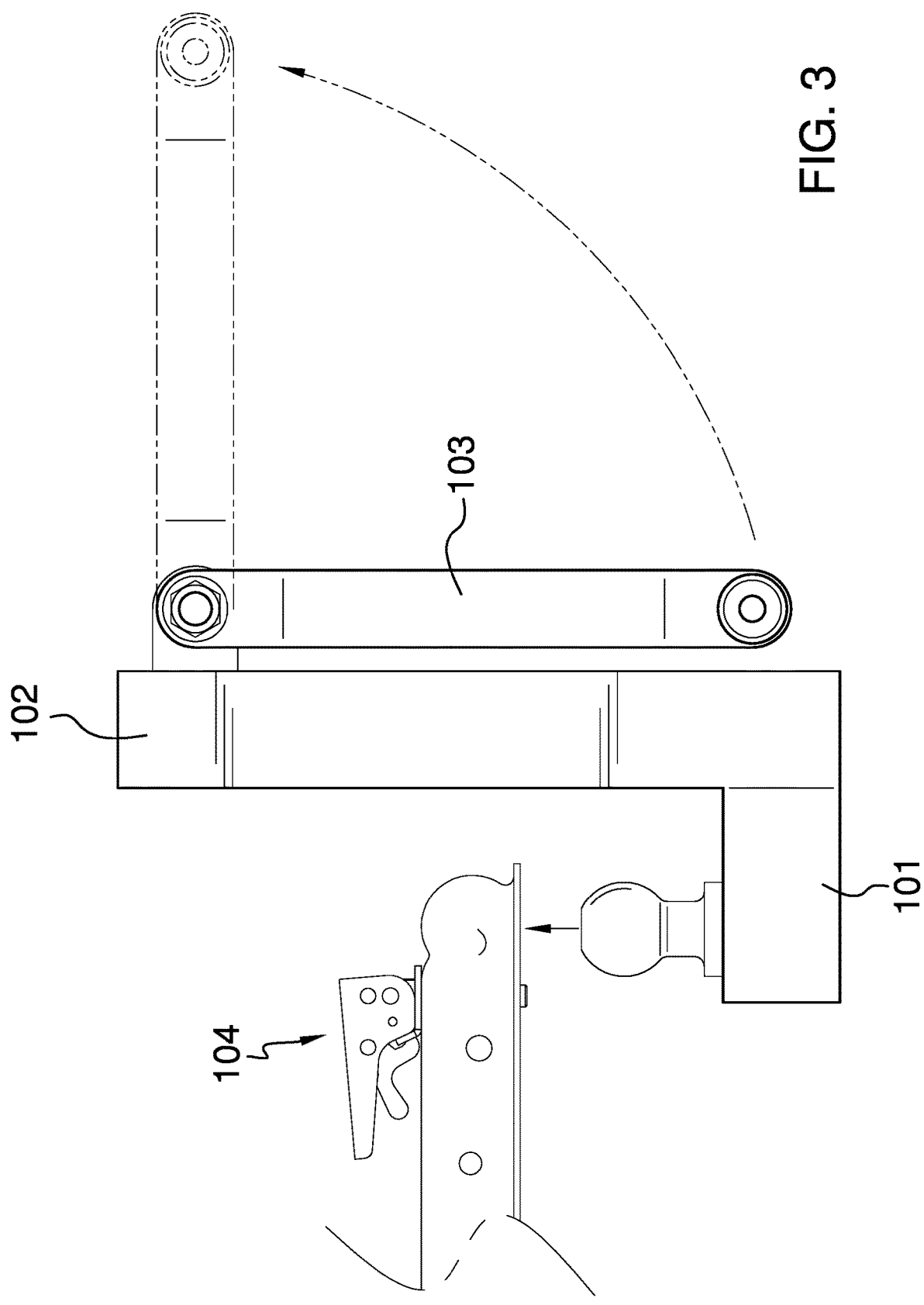
FIG. 3 is a side view of an embodiment of the disclosure.
Figure 4:
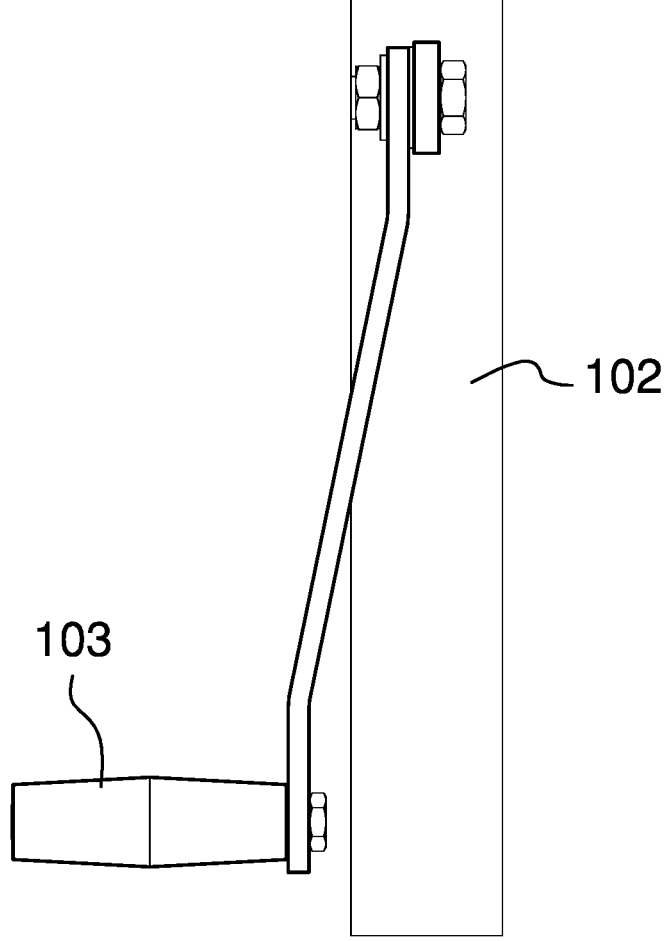
FIG. 4 is a posterior view of an embodiment of the disclosure.
Figure 5:
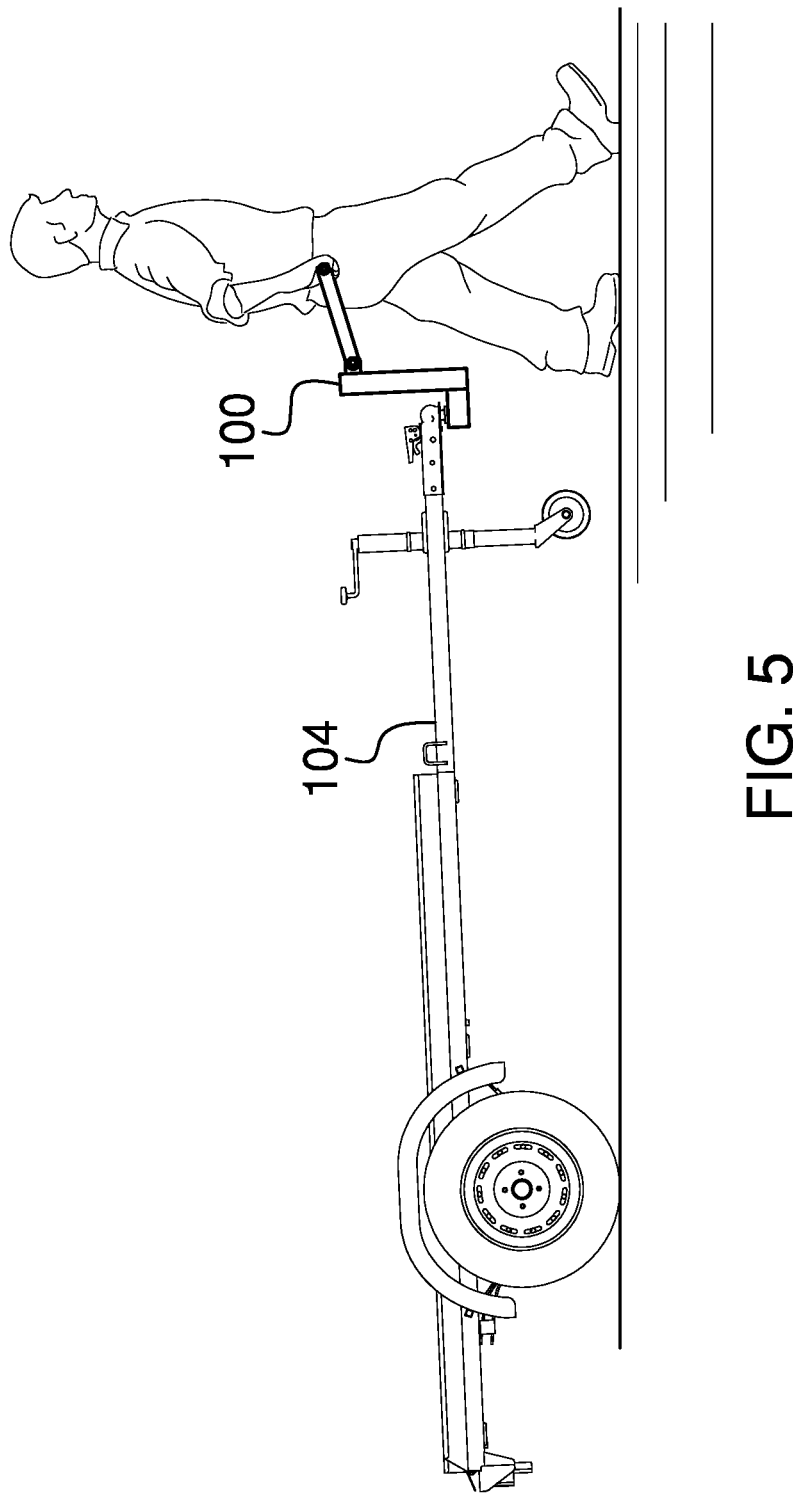
FIG. 5 is an in-use view of an embodiment of the disclosure.

Detailed reference will now be made to one or more potential embodiments of the disclosure, which are illustrated in FIGS. 1 through 5.

The device for manually moving a trailer 100 (hereinafter invention) is a mechanical device. The invention 100 removably attaches to a trailer 104. The invention 100 forms a grip that allows the trailer 104 to be manually moved. The invention 100 comprises a hitch beam structure 101, an elevating stanchion structure 102, and a handle structure 103. The hitch beam structure 101 attaches to the elevating stanchion structure 102. The handle structure 103 attaches to the elevating stanchion structure 102. The hitch beam structure 101 forms the removable attachment with the trailer 104.

The trailer 104 is a vehicle. The trailer 104 is configured for use in carrying cargo. The trailer 104 is an unpowered vehicle.

The hitch beam structure 101 is a prism structure. The hitch beam structure 101 is a rigid structure. The hitch beam structure 101 is a prism tubing structure. The hitch beam structure 101 is a load bearing structure. The hitch beam structure 101 forms the structure that attaches the invention 100 to the trailer 104. The hitch beam structure 101 receives a motive force from the elevating stanchion structure 102. The hitch beam structure 101 transfers the received motive force to the trailer 104 such that the trailer 104 will roll over a supporting surface.

The hitch beam structure 101 further comprises a ball hitch 111. The ball hitch 111 is a mechanical structure. The ball hitch 111 mounts on the lateral face of the prism tubing structure of the hitch beam structure 101. The ball hitch 111 removably attaches the invention 100 to the trailer 104. The ball hitch 111 is a ball hitch 111. The ball hitch 111 is defined elsewhere in this disclosure.

The elevating stanchion structure 102 is a prism structure. The elevating stanchion structure 102 is a rigid structure. The elevating stanchion structure 102 is a prism tubing structure. The hitch beam structure 101 permanently attaches to the elevating stanchion structure 102. The elevating stanchion structure 102 is a load bearing structure. The elevating stanchion structure 102 forms the structure that attaches the handle structure 103 to the hitch beam structure 101. The elevating handle structure 102 elevates the handle structure 103 above the hitch beam structure 101. The elevating stanchion structure 102 receives a motive force from the handle structure 103. The elevating stanchion structure 102 transfers the received motive force to the hitch beam structure 101.

The elevating stanchion structure 102 further comprises a pivot structure 121. The pivot structure 121 is a mechanical structure. The pivot structure 121 attaches to the lateral face of the prism tubing structure of the elevating stanchion structure 102. The pivot structure 121 is a rotating structure. The pivot structure 121 forms an anchor point that secures the handle structure 103 to the elevating stanchion structure 102. The pivot structure 121 attaches the handle structure 103 to the elevating stanchion structure 102 such that the handle structure 103 rotates relative to the elevating stanchion structure 102.

The handle structure 103 forms the handle that allows the invention 100 and the trailer 104 to be elevated and moved. The handle structure 103 attaches to the lateral face of the prism tubing structure of the pivot structure 121 of the elevating stanchion structure 102. The handle structure 103 attaches to the elevating stanchion structure 102 such that the handle structure 103 rotates relative to the elevating stanchion structure 102. The handle structure 103 forms a grip that allows the trailer 104 to be manually transported over a supporting surface. The handle structure 103 is a rotating structure. The handle structure 103 rotates relative to the elevating stanchion structure 102.

The handle structure 103 further comprises an extension structure 131 and a grip structure 132. The extension structure 131 is a mechanical structure. The extension structure 131 is a rigid structure. The extension structure 131 is an extension structure 131. The extension structure 131 bridges the reach between the pivot structure 121 and the grip structure 132. The grip structure 132 forms a grip that allows the handle structure 103 to be grasped by a hand. The grip structure 132 is grasped by the individual pulling the invention 100. The grip structure 132 attaches to the end of the extension structure 131 that is distal from the pivot structure 121.

The following definitions were used in this disclosure:

Aft: As used in this disclosure, aft is term that relates a first object to a second object. When the second object is closer to the stern of a vehicle, the second object is said to be aft of the first object. The term is commonly used on vessels and vehicles.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Ball Hitch: As used in this disclosure, a ball hitch is a type of hitch that is used to attach a trailer to a tractor. The ball hitch comprises a stanchion structure and a roughly sphere shaped structure. The stanchion structure is a rigid prism shaped structure. The roughly ball shaped structure is a rigid structure that mounts on a congruent end of the stanchion structure. The ball hitch mounts on a vehicle selected from the group consisting of a tractor and a trailer. The roughly ball shaped structure is geometrically similar to a negative space that is formed on the unselected vehicle. The roughly ball shaped structure inserts into the negative space to attach the trailer to the tractor.

Beam: As used in this disclosure, a beam is a horizontally oriented load bearing structure.

Bow: As used in this disclosure, the bow refers to the anterior side of an object, vehicle, or vessel. Specifically, the bow refers to the structure that leads the object, vehicle, or vessel into the primary sense of direction of the object vehicle, or vessel.

Bridge: As used in this disclosure, a bridge refers to a load bearing structure that attaches a first object and to a second object such that a load bearing path is formed between the first object and the second object. The verb "to bridge" means to establish a connection (or remove a disconnection) between a first object and a second object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Forward: As used in this disclosure, forward is term that relates a first object to a second object. When the first object is closer to the bow of a vehicle, the first object is said to be forward of the second object. The term is commonly used on vessels and vehicles. See bow, aft, port, starboard, and stern Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Hitch: As used in this disclosure, a hitch is a fastening apparatus that attaches an unpowered vehicle, such as a trailer, to a motorized vehicle such that the motorized vehicle can tow the unpowered vehicle. The term trailer hitch is a synonym for a hitch.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Offset Composite Prism: As used in this disclosure, an offset composite prism structure is a non-Euclidean structure. The shape of the offset composite prism structure is reasonably approximated by a plurality of prism structures. The shape of the offset composite prism structure is formed by joining the congruent end of a first prism structure is joined to the congruent end of a second structure such that the center axis of the first prism structure forms a cant with the center axis of the second prism structure.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Pivot: As used in this disclosure, a pivot is a rod or shaft around which an object rotates or swings.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Prism Tubing: As used in this disclosure, prism tubing is a prism prism-shaped structure. The prism tubing forms a hollow tubular structure. The prism tubing is a metal structure that is commonly used for structural purposes. The term punched prism tubing refers to a prism tubing with a plurality of diametrically opposed aperture pairs formed through the lateral faces of the prism structure of the prism tubing. The punched prism tubing is often referred to as a perforated prism tubing. A bent prism tubing refers to a prism tubing with a curvature that is formed in the center axis. Prism tubing is commonly called square tubing. Always use diameter, diametrically opposed, radial and tube.

Radial: As used in this disclosure, the term radial refers to a direction that: 1) is perpendicular to an identified central axis; or, 2) projects away from a center point.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Stanchion: As used in this disclosure, a stanchion refers to a vertically oriented prism-shaped pole, post, or support.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tractor: As used in this disclosure, a tractor is a vehicle having a powerful diesel or gasoline powered engine that is used to tow one or more trailers.

Trailer: As used in this disclosure, a trailer is an unpowered wheeled vehicle that is towed by a powered vehicle such as a tractor.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A device for manually moving a trailer comprising a hitch beam structure, an elevating stanchion structure, and a handle structure;

wherein the elevating stanchion structure is a tubing structure;

wherein the hitch beam structure attaches to the elevating stanchion structure;

wherein the elevating stanchion structure further comprises a pivot structure;

wherein the pivot structure attaches to a lateral face of the tubing structure of the elevating stanchion structure;

wherein the handle structure attaches to a lateral face of the pivot structure;

wherein the device for manually moving a trailer removably attaches to a trailer;

wherein the hitch beam structure forms the removable attachment with the trailer;

wherein the handle structure forms the handle that allows the device for manually moving a trailer and the trailer to be elevated and moved;

wherein the handle structure attaches to the elevating stanchion structure such that the handle structure rotates relative to the elevating stanchion structure;

wherein the handle structure forms a grip that allows the trailer to be manually transported over a supporting surface.

2. The device for manually moving a trailer according to claim 1 wherein the hitch beam structure is a rigid structure;

wherein the hitch beam structure is a tubing structure;

wherein the hitch beam structure is a load bearing structure;

wherein the hitch beam structure forms the structure that attaches the device for manually moving a trailer to the trailer;

wherein the hitch beam structure receives a motive force from the elevating stanchion structure;

wherein the hitch beam structure transfers the received motive force to the trailer.

3. The device for manually moving a trailer according to claim 2 wherein the elevating stanchion structure is a rigid structure;

wherein the hitch beam structure permanently attaches to the elevating stanchion structure;

wherein the elevating stanchion structure is a load bearing structure;

wherein the elevating stanchion structure forms the structure that attaches the handle structure to the hitch beam structure;

wherein the elevating stanchion structure elevates the handle structure above the hitch beam structure;

wherein the elevating stanchion structure receives a motive force from the handle structure;

wherein the elevating stanchion structure transfers the received motive force to the hitch beam structure.

4. The device for manually moving a trailer according to claim 3 wherein the handle structure is a rotating structure;

wherein the handle structure rotates relative to the elevating stanchion structure.

5. The device for manually moving a trailer according to claim 4 wherein the hitch beam structure further comprises a ball hitch;

wherein the ball hitch is a mechanical structure;

wherein the ball hitch mounts on a lateral face of the tubing structure of the hitch beam structure;

wherein the ball hitch removably attaches the device for manually moving a trailer to the trailer.

6. The device for manually moving a trailer according to claim 5 wherein the pivot structure is a mechanical structure;

wherein the pivot structure is a rotating structure;

wherein the pivot structure forms an anchor point that secures the handle structure to the elevating stanchion structure;

wherein the pivot structure attaches the handle structure to the elevating stanchion structure such that the handle structure rotates relative to the elevating stanchion structure.

7. The device for manually moving a trailer according to claim 6 wherein the handle structure further comprises an extension structure and a grip structure;

wherein the grip structure attaches to the extension structure.

8. The device for manually moving a trailer according to claim 7 wherein the extension structure is a mechanical structure;

wherein the extension structure is a rigid structure;

wherein the extension structure bridges the reach between the pivot structure and the grip structure.

9. The device for manually moving a trailer according to claim 8 wherein the grip structure forms a grip that allows the handle structure to be grasped by a hand;

wherein the grip structure is grasped by an individual pulling the device for manually moving a trailer;

wherein the grip structure attaches to the end of the extension structure that is distal from the pivot structure.

\* \* \* \* \*